Nov. 10, 1953

J. L. CLOUGH ET AL 2,658,513

AUTOMATIC SELECTION CONTROL FOR
DRUM-TYPE STORAGE FILES

Filed Nov. 26, 1943

INVENTOR
JEROME L. CLOUGH
CHAUNCEY C. CLOUGH
BY
Wheeler, Wheeler & Wheeler
ATTORNEYS

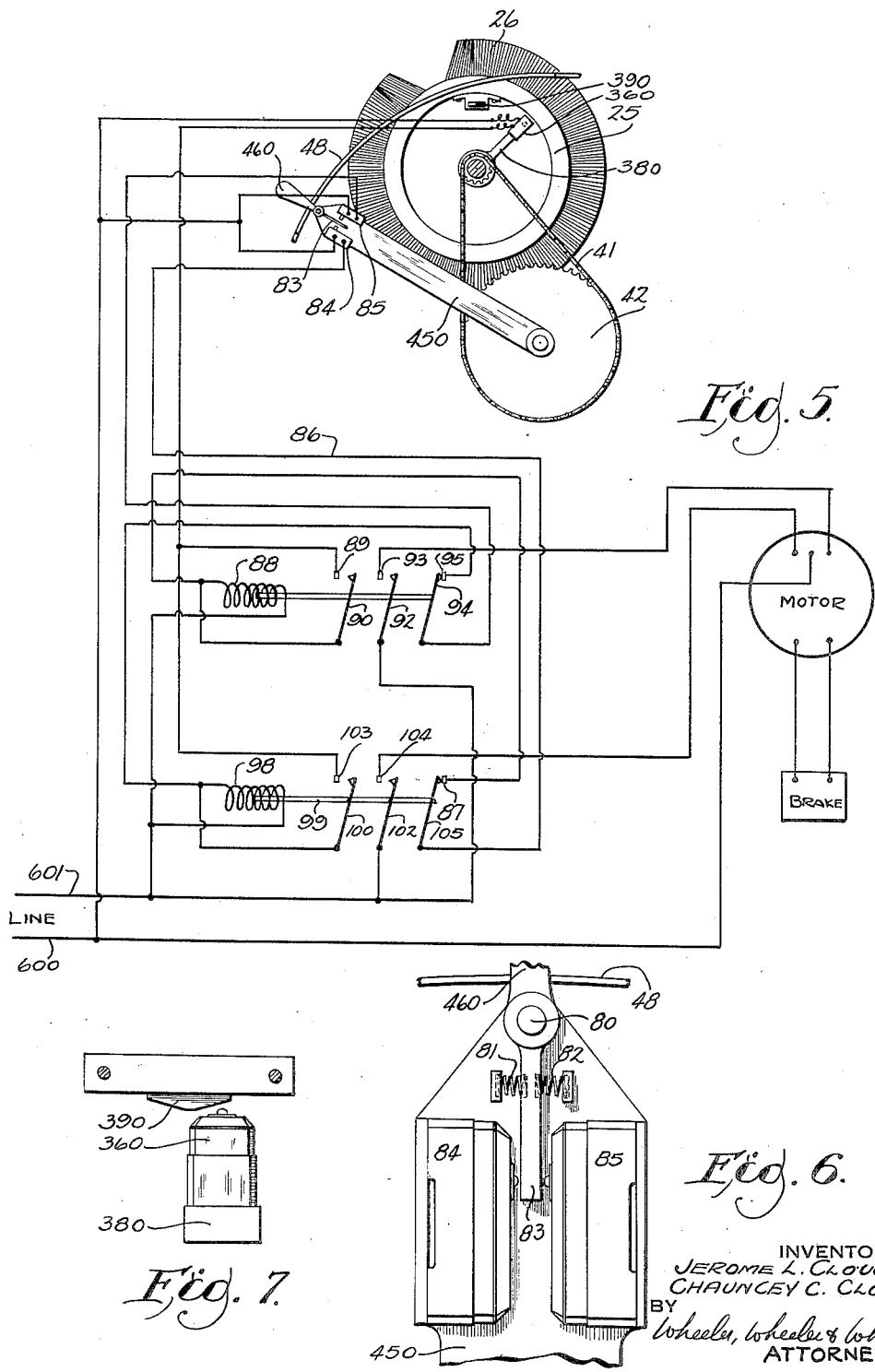

Nov. 10, 1953
J. L. CLOUGH ET AL
2,658,513
AUTOMATIC SELECTION CONTROL FOR
DRUM-TYPE STORAGE FILES
Filed Nov. 26, 1943
5 Sheets—Sheet 3
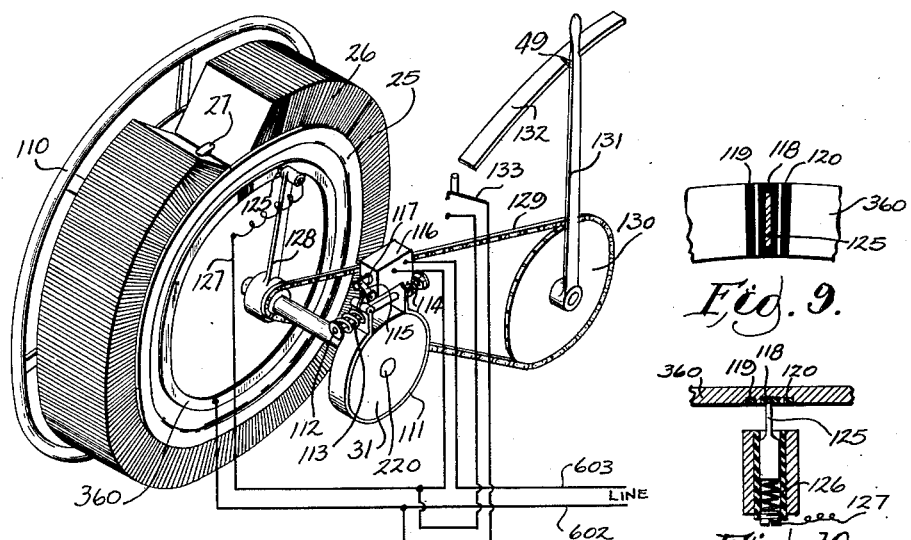
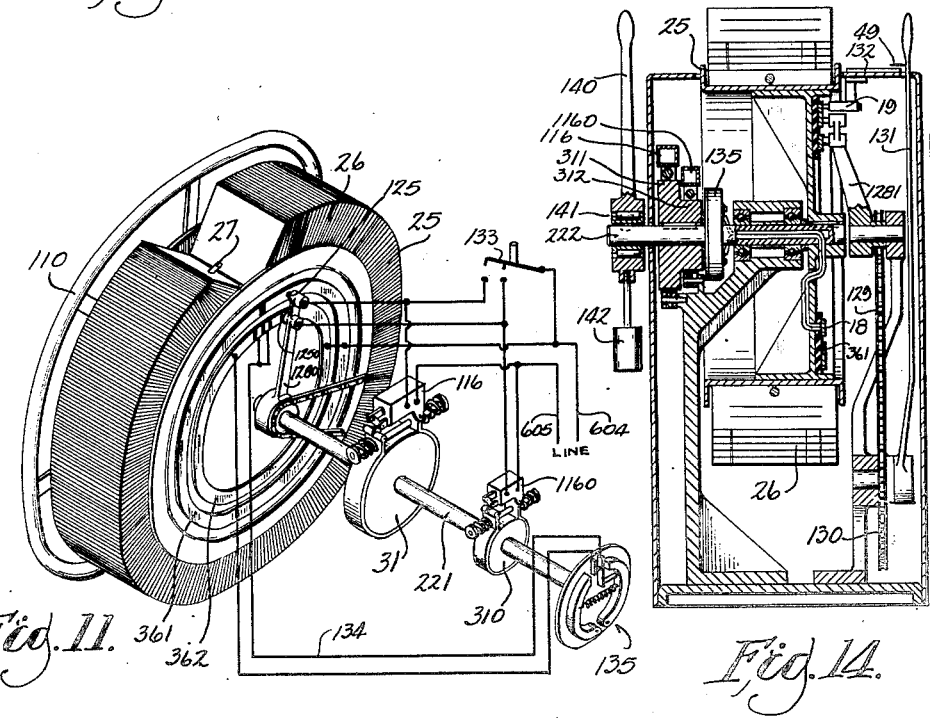
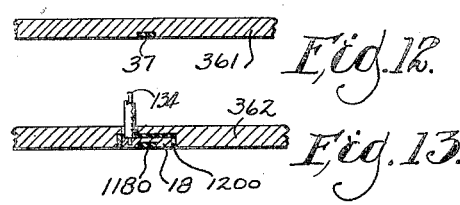
INVENTOR
JEROME L. CLOUGH
CHAUNCEY C. CLOUGH
BY
Wheeler, Wheeler & Wheeler
ATTORNEYS.

Nov. 10, 1953
J. L. CLOUGH ET AL
2,658,513
AUTOMATIC SELECTION CONTROL FOR
DRUM-TYPE STORAGE FILES
Filed Nov 26, 1943
5 Sheets-Sheet 5
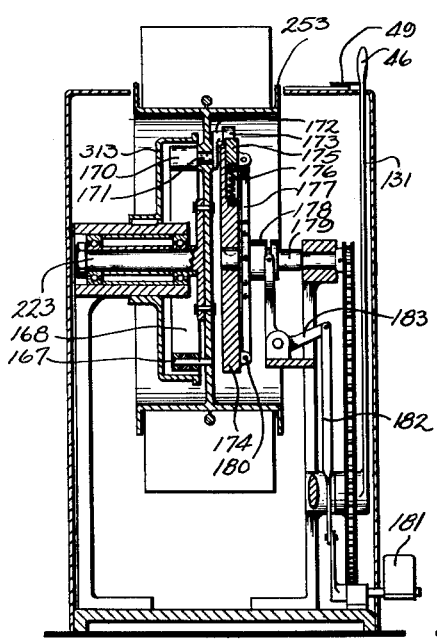
Fig. 17.
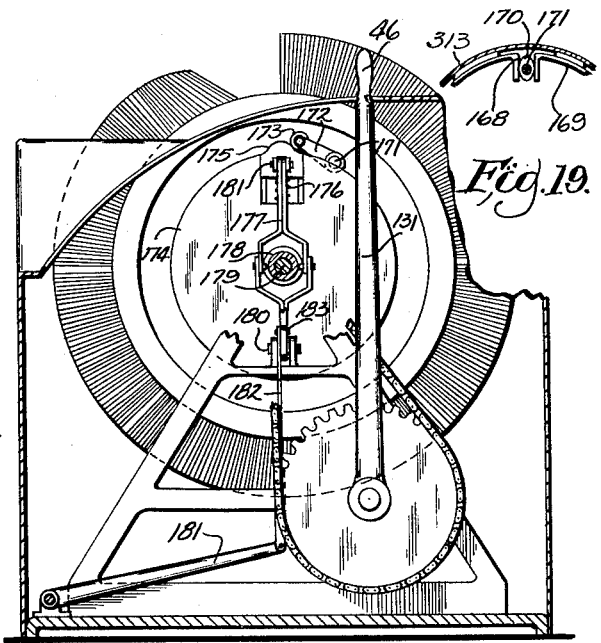
Fig. 19.
Fig. 18.
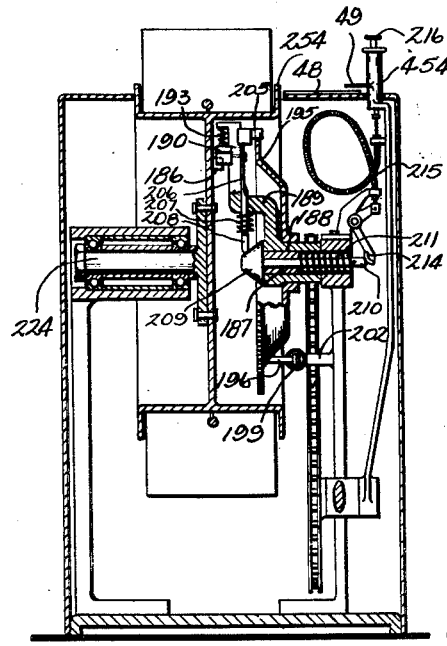
Fig. 20.
Fig. 23.
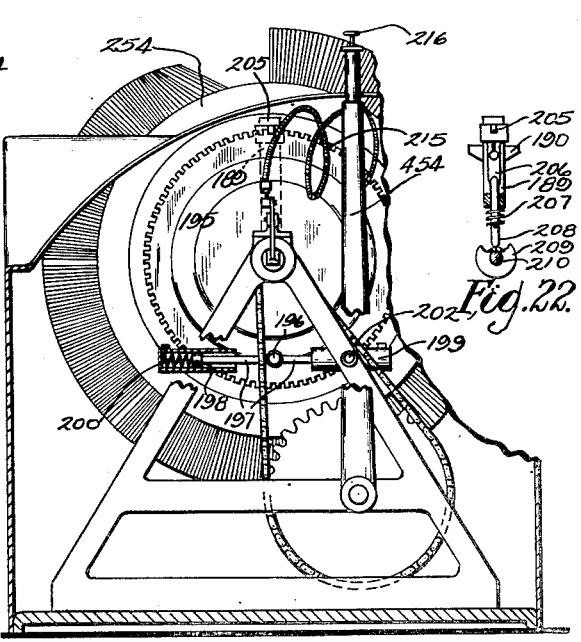
Fig. 22.
Fig. 21.
INVENTOR
JEROME L. CLOUGH
CHAUNCEY C. CLOUGH
BY
Wheeler, Wheeler & Wheeler
ATTORNEYS.

Patented Nov. 10, 1953

2,658,513

UNITED STATES PATENT OFFICE 2,658,513

AUTOMATIC SELECTION CONTROL FOR DRUM-TYPE STORAGE FILES

Jerome L. Clough and Chauncey C. Clough, Milwaukee, Wis.

Application November 26, 1943, Serial No. 511,822

7 Claims. (Cl. 129—16.1)

This invention relates to an automatic selection control for a drum-type storage file.

Some phases of the present invention are concerned with means for the mechanical actuation of such a file to a selected position but, more broadly, it is one of the major objectives of the present invention to stop the rotation of the file in a selected position regardless of how it may be actuated, whether mechanically or by hand.

A file of this type, being circular, may be operated in either direction to the desired stopping point. Due, however, to the characteristics of the file, it is an objective of the invention to preferably operate the file always in the same direction to the stopping point when the control of its indexing movement is to be automatic. It is also a desired feature to have the indexing control function directly on the record-carrying drum. By avoiding the use of any intervening motion transmitting connections, I seek to be able to stop the drum with a desired card exposed at the selected inspection station, or within one or two cards of a position of exposure at such station. To achieve such accuracy of indexing movement is a very desirable and noteworthy objective, inasmuch as such a drum carries many thousands of cards.

Another important object of the invention is to permit such a drum to be operated either with or without the indexing control, as may be desired, and to permit the drum to be rotated in either direction to the desired index point, if desired, and to dispense with brush and commutator control means, while still obtaining accurate indexing operation.

It is a further object to enable the wheel to be "inched" in an indexing direction when desired.

Where the greatest accuracy is desired, it is a further object of the invention to so control the braking of the drum that the final braking operation will always be initiated at a substantial constant drum speed so that the exact point to which the drum will be indexed can be determined with greater accuracy than would be possible if the final braking operation were initiated at a variety of speeds.

Various other objects of the invention will be apparent to those skilled in the art upon analysis of the following disclosure thereof.

In the drawings:

Fig. 5 is a modified circuit diagram showing a modified embodiment of the construction illustrated in Figs. 1 to 4, a detail of the control lever being shown in elevation.

Fig. 6 is an enlarged detail view in elevation of a portion of the control lever used in Fig. 5.

Fig. 7 is an enlarged detail in plan of the indexing switch assembly used in the construction of Figs. 5 and 6.

Fig. 8 is a diagrammatic view in perspective of a modified embodiment of the invention.

Fig. 9 is an enlarged detail in elevation of a brush and commutator assembly used in the construction of Fig. 8, the brush being shown in section.

Fig. 10 is an enlarged detail in horizontal section through the brush and commutator assembly shown in Fig. 9.

Fig. 11 is a diagrammatic, perspective view of a further modified embodiment of the invention.

Fig. 12 is an enlarged detail in horizontal section of one of the two commutators used in the device of Fig. 11.

Fig. 13 is an enlarged detail in horizontal section of the other of the two commutators used in Fig. 11.

Fig. 14 is a view in transverse section of a further modified embodiment of the invention.

Fig. 17 is a view in cross section through an embodiment using a mechanical indexing system for applying the brake.

Fig. 18 is a view partially in side elevation and partially in section through the device of Fig. 17.

Fig. 19 is a fragmentary detail in section of the brake shoe expanding mechanism used in Figs. 17 and 18.

Fig. 20 is a view similar to Fig. 17 showing a further modification using a mechanical indexing system without a brake.

Fig. 21 is a view similar to Fig. 18 of the device shown in Fig. 20.

Fig. 22 and Fig 23 are details in side elevation of dogs used in the device of Figs. 20 and 21.

Like parts are identified by the same reference characters throughout the several views.

The device shown in Figs. 1 to 4 will first be described.

Figure 2:
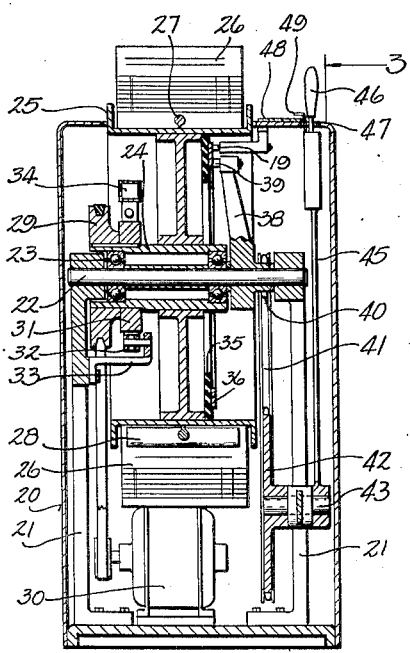
Fig. 2 is a view in transverse section through the device of Fig. 1.

Within a cabinet 20, there is a frame 21 supporting a stationary bar at 22 from which antifriction bearings 23 support the hub 24 of a drum 25, whereof the upper peripheral portion is exposed through the top of cabinet 20. Records 26 are carried in any desired manner on the periphery of the drum. A convenient means of holding it in place may comprise a rod 27 encircling the drum and passing through apertures in the respective cards, each card preferably having a slot affording communication with its aperture from its lower margin to facilitate the application and removal of cards, as best shown in Fig. 2.

Since the wheel is to be controlled with reference to a fixed index, it is desirable to keep the cards from creeping about the periphery of the wheel. For this purpose, I may employ at intervals about the wheel stops such as that shown at 28 in Figs. 2 and 3, comprising a bent sheet of resilient stock mounted on the rod 27. By pressing the divergent legs of the stop together, it may readily be slipped along the rod 27 to a desired point and, when permitted to spring open to the position shown in Fig. 3, it will crampingly engage the rod to retain its adjusted position thereon. While the stop is shown only in these two views, it will be understood that something of the sort is preferably used in all of the index-controlled wheels.

The hub 24 of the drum carries a pulley 29 connected by belt with a motor 30 housed in the base of the cabinet. The hub 24 also carries a brake disk 31 peripherally engaged by brake shoes 32 pivoted on a pin carried by bracket arm 33. The brake may be of a conventional design of the general order of those illustrated more particularly in Figs. 8 and 11 in which springs normally apply the brake but are overpowered to release the brake when an electromagnet 34 is energized. As indicated in Fig. 4, the brake is electrically connected with motor 30 so that whenever the motor is energized, the brake is also energized to its releasing position.

The indexing control comprises relatively movable commutator elements, one of which is manually adjustable and the other connected with the drum. As illustrated, there is a dielectric annulus 35 mounted directly on the side of the drum 25 and supporting a commutator segment 36 having a gap or dead spot at 37, as best shown in Fig. 4. Mounted coaxially with the segment 36 for rotation about the fixed bar 22 is an arm 38 carrying a brush 39. A sprocket 40 connected with arm 38 is connected by chain 41 with a sprocket 42 on a rock shaft 43 to which the hand lever 45 is connected. The grip portion 46 of this hand lever projects from the casing to be manipulated by the operator. A slot 47 in the casing provides for the operation of the hand lever throughout its range of movement respecting a fixed alphabetical index at 48 which, because of its length and form, may be worked out with great fineness. The index 48 is preferably located upon a convexly sloping wall of the cabinet 20 drawn concentrically about the axis of rock shaft 43. A pointer 49 connected with the lever 45 moves over the index to indicate accurately the name opposite to which the drum 25 will come to rest.

Figure 1:
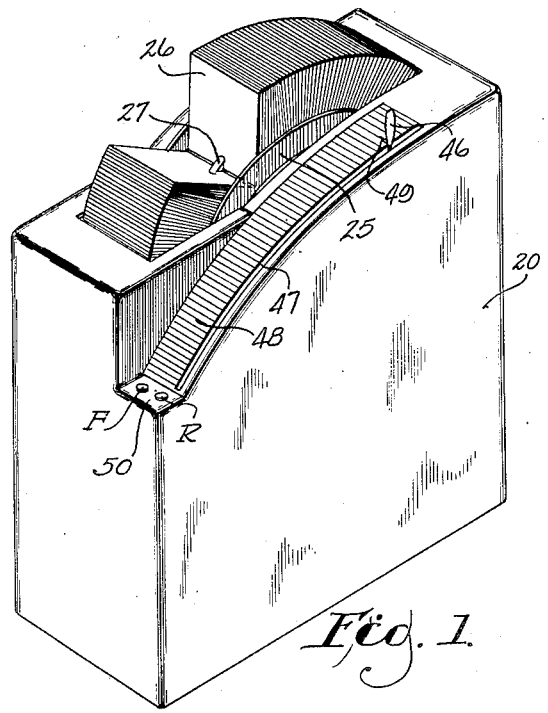
Fig. 1 is a view in perspective showing the application of indexing control mechanism embodying the present invention to a drum-type record carrier of otherwise standard construction.
Figure 4:
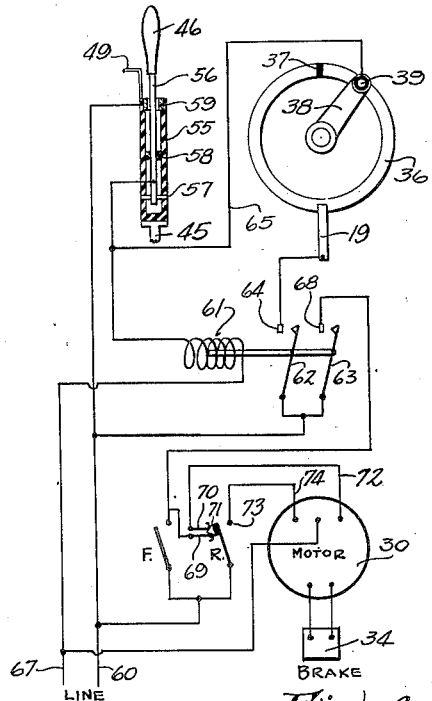
Fig. 4 is a circuit diagram of the circuit connections employed in the device illustrated in Figs. 1, 2 and 3, a portion of the control lever being shown in detail in vertical section.

At the bottom of the index scale 48, there is a portion 50 of the cabinet on which there are two manually operable switch buttons marked F and R in Fig. 1 and Fig. 4. Where it may be desired to operate the motor by hand either forwardly or in reverse, independently of the automatic indexing mechanism, the appropriate push button is depressed and through circuit means hereinafter to be described will cause the proper operation of the motor until the push button is released.

When the automatically operable indexing mechanism is employed to bring the record drum to a selected position, the hand lever is shifted manually until the pointer 49 indicates the desired position on the index. This results in displacing the brush 39 from the dead point 37, engaging it with the commutator segment 36. Regardless of which direction the brush is displaced from the dead point, the connections are such, in this exemplification of the invention, that the motor always operates in one direction, this direction being such as to move the drum counterclockwise as viewed in Fig. 1 and Fig. 3, thereby producing a corresponding movement of the commutator segment as viewed in Fig. 4. The energization of the motor automatically releases the brake. The motor continues to operate until the dead spot 37 passes beneath the brush, whereupon the motor and brake are deenergized and the brake automatically applies itself to bring the drum to rest.

Since the automatic operation of the device invariably results in the stopping of the dead point 37 beneath the brush, it will be apparent that any operation of the motor by hand, through the use of the push buttons F or R to a new point, would, but for the arrangements now to be disclosed, leave the brush engaged with the commutator segment 36 so that, instead of stopping, the drum would continue back to its initial position. To prevent this, I incorporate in the circuit a special switch controlled by the operator's manipulation of the hand grip portion 46 of the lever 45. Unless this switch is closed, the commutator segment 36 is deenergized. Consequently, any manipulation of the push buttons F and R which may register the brush 39 with the segment 36 will not result in further movement of the drum until the grip portion 46 is again manipulated.

For the purposes stated, the end of lever 45 constitutes a dielectric tube 55 (Fig. 4) through which extends the shank 56 of the grip portion 46. This shank portion is pivoted within the tube upon a cross pin 57. An annular rubber grommet 58 tends to center it within the tube, elastically restoring it to center when displaced. The shank 56 is an electrical conductor and, when displaced in any direction, it makes contact with the contact ring 59 at the outer end of the tube 57, thereby closing a circuit from the line conductor 60 to the relay 61.

The contacts 62 and 63 of the relay are connected to the same line conductor 60. When the relay is energized, contact 62 engages fixed contact 64, thereby energizing the commutator segment 36. Through the brush 39 engaged with such segment, current flows through conductor 65 back to the relay 61 and thence to line conductor 67.

The other relay contact 63, upon engaging stationary contact 68, closes a circuit through the stationary contacts 69 and 70 and the intervening knife blade 71 with conductor 72 to operate the motor 30 in the forward direction which results in counterclockwise rotation of the drum, as above described. The circuit through relay contact 62 and 64 will serve as a holding circuit to maintain the motor energized until brush 39 registers with the dead spot 37 whereupon the relay circuit as well as the contacts 62 and 63 will open, being biased to the position in which they are illustrated in Fig. 4. The motor will thereupon stop and the brake will function to arrest drum rotation.

The closing of the switch F completes a manually controlled circuit through line 72 and contacts 69 and 70 from line 60 to motor 30 to line 67 without actuating the relay. Consequently, this circuit will open as soon as the switch F is released, the switch being biased to the open position in which it is illustrated in Fig. 4.

The switch R, normally biased to the position shown in Fig. 4, may be moved manually to close the circuit from line conductor 60 to stationary contact 73 and conductor 74 to the reversing terminal of motor 30 and thence back to line conductor 67. Switch R carries the knife blade contact 71, being insulated therefrom as shown in Fig. 4. Thus the operation of switch R to actuate the motor in reverse will open the circuit between contacts 69 and 71. The purpose of this arrangement is to make it impossible to energize the motor in a forward direction when it is energized in a reverse direction.

Figure 3:
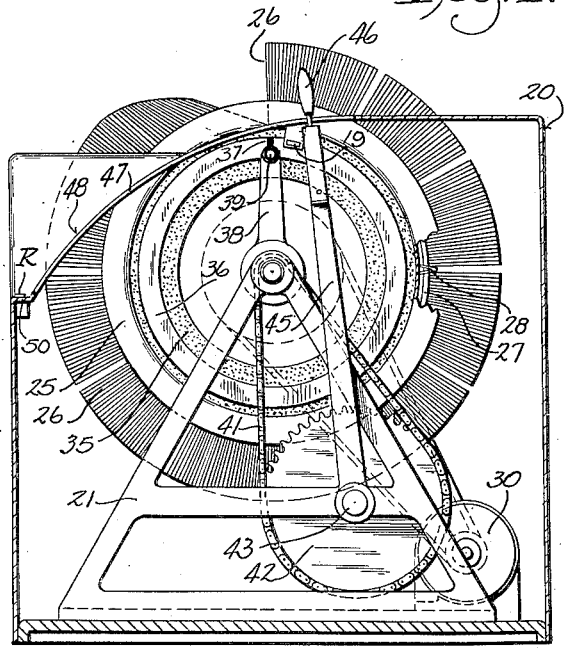
Fig. 3 is a view taken on the section line indicated at 3—3 of Fig. 2.

It will be noted that the cards 26 on the periphery of wheel 25 have their lower margins rather closely confined about the rod 27. The difference in diameter as between the periphery of the wheel proper and the outer periphery of the set of cards mounted thereon is such, however, that if all the cards assume truly radial positions, their outer margins would be spaced materially from each other. In practice, these spaces are cumulative so that the cards tend to fall open as indicated in Figs. 1 and 3.

The object in having the wheel always turn in the same direction, at least when the automatic indexing mechanism is functioning, is to cause this opening in the cards to occur at a predetermined point. It will be obvious that as the wheel rotates counterclockwise, successive cards will tend to fall from their erect position to an approximately horizontal position at the inspection station. If the wheel were turned in a clockwise direction, the open gap thus formed would be carried to an entirely different position on the wheel and, as a result, the operator could not tell as accurately where to expect to find the particular card sought. Since the wheel always turns toward the operator at the inspection station, the gap will always occur at substantially the same place and the automatic indexing mechanism will function with great precision so that the desired card will always be found substantially at the point where the gap is located when the wheel comes to rest.

With the wheel at rest, the brake is invariably applied. Consequently, the card which is approximately horizontal is firmly supported in that position to present a writing surface to the operator, who may make notations on the card without removing it from the wheel.

Existing wheel or drum record carriers are already provided with forward and reverse buttons, but these buttons merely operate a motor. The present device, almost within the same dimensions, provides for automatic selection and for alternative manual or automatic indexing and for automatic brake control.

The construction disclosed in Figs. 5, 6 and 7 on sheet 2 includes two additional features, either one or both of which may be incorporated, if desired, in the construction shown in Figs. 1, 2 and 4. The Fig. 5 circuit provides for automatic indexing in both directions, instead of the single direction of indexing operation which, for reasons explained above, is preferred for the purposes of the present application. The second feature disclosed in Figs. 5, 6 and 7 is the use of switches instead of brush and commutator segments to control the automatic indexing.

The wheel 25 may correspond identically to that disclosed in Figs. 1 to 4. Instead of a commutator segment, it carries a cam 390 with beveled surfaces for engaging the contacting actuating button switch 360. This switch is mounted on the arm 380 connected by chain 41 with sprocket 42 operated by hand lever 450 exactly as above described. In each instance, the movement of the hand lever over the entire index scale 48 produces one complete rotation of the lever 38 or 380.

As long as the cam is centered with respect to the switch button 360, the switch will be open. The switch used is preferably of the type sold under the trade-mark Micro Switch, requiring an infinitesimally small movement for its operation between open and closed position. Such switches are available in forms which are biased either toward open or closed positions. The particular switch used at this point is preferably one which is biased toward its closed position, being held open only by engagement with cam 390. It will be evident, therefore, that any displacement of arm 380 by manipulation of the hand lever 450 to a new index position will close the circuit through the switch. As will be explained hereinafter, this will energize the motor which will continue in operation until the switch again registers with the cam, whereupon operation will cease.

To determine the direction of operation, I provide not one but two switches controlled by the hand grip 460. The hand grip 460 is pivoted to lever 450 on pintle 80. It is centered by springs 81 and 82. The slightest displacement of the lever from its centered position will cause its free lower end portion 83 to engage the actuators of one or the other of the switches 84 and 85.

The switches 84 and 85 are normally open. They are so wired into the circuit that the appropriate one will be closed to cause the drum 25 to rotate in the same direction in which the lever is pushed by the operator. Thus if the operator pushes rearwardly on the hand grip 460 to move lever 450 clockwise, the drum 25 will rotate clockwise.

Whereas if the operator pulls forwardly on the hand grip 46 to move lever 450 counterclockwise, the drum will rotate counterclockwise. Not only the switch 36 but one or the other of the switches 84 or 85 must be closed before the brake will be deenergized and the motor will operate.

Current from line conductor 600 is led to both of the switches 84 and 85. From switch 84 conductor 86 leads through the normally closed relay contact 87 to the energizing coil 88 of the other relay and thence back to line conductor 601. Thus when switch 84 is closed, relay coil 88 is energized.

Assuming the manipulation of lever 450 has resulted in displacing switch actuator 360 from cam 390, a circuit is established through switch 360 from line conductor 600 and relay contacts 89 and 90 to establish a holding circuit through the energizing coil 88 of such relay back to line conductor 601. At the same time, another circuit is established through relay contacts 92 and 93 through the motor from line conductor 600 to line conductor 601, thus operating the motor in a clockwise or reverse direction.

These circuits, once established, will remain established until the switch 360 again registers with cam 390, at which time the holding circuit is broken and the relay opens. It is important that the operation, once commenced in a given direction, should continue in that direction until the holding circuit is thus opened. Otherwise the operator might, in fumbling for the exact desired position of the index control lever 450 operate the switches 84 and 85 alternately several times before reaching exactly the desired point. As the circuit is shown, the energization of relay coil 88 opens contacts 94 and 95 controlling the only circuit through which the other relay can be energized.

Assuming the operator to have pulled the grip 460 toward himself, in initiating the indexing movement, the switch 85, instead of the switch 84, will be closed. This will establish a circuit from line conductor 600 through relay contacts 94 and 95 to the energizing coil 98 of the lower relay shown in Fig. 5. The response of the armature 99 of this relay will close the normally open contacts 100 and 102 with the respective stationary contacts 103, 104 and will open the normally closed contact 105 from engagement with its stationary contact 87. This precludes any possibility of the energization of relay coil 88 while, at the same time, the holding circuit is established from line conductor 600 through the cam operated switch 360 on arm 380 and relay contacts 103 and 100 and energizing coil 98 back to line conductor 601. Meantime, the motor circuit has been established between conductors 600 and 601 through contacts 102 and 104 to operate the motor in a counterclockwise or forward direction, while at the same time releasing the brake.

It is entirely feasible to provide for reversal while using brush and commutator segments, as indicated in Fig. 1 or to provide for uni-directional automatic operation while using switches instead of the commutator segments. Therefore, it will be understood by those skilled in the art that either one of the features just described in conjunction with Figs. 5, 6 and 7 may alternatively be used in the construction of Figs. 1 to 4, as desired.

The various constructions shown in Figs. 8 to 13, inclusive, relate primarily to braking mechanisms which are usable not only on the hand operated wheels or drums here illustrated, but may also be substituted for braking mechanisms heretofore described. Used with or without a motor, a brake for automatically arresting the movement of a record carrier at a point determined with reference to a fixed index is of value. Particularly valuable is the arrangement shown in Figs. 11 to 13 wherein there is a preliminary braking action which reduces the speed to a predetermined value so that the drum will stop in a fixed interval in every instance. Also desirable, for many purposes, is the type of hand actuating mechanism shown in Fig. 14. These constructions will now be described.

The wheel or drum 25 in Fig. 8 may be identical with the wheel or drum previously disclosed, but it is equipped with a hand wheel 110 which the operator may grasp to set the drum into rotation. The brake disk or drum 31 on the shaft 220 which turns with the record carrying drum 25 is provided with a brake band 111 having upstanding ends through which passes a bolt 112 upon which compression springs 113 and 114 are mounted to urge the ends of the brake band toward each other into binding engagement with disk 31.

Through lever mechanism 115, of conventional design, the compression of springs 113, 114 may be overcome when a coil in housing 116 is energized. No claim is made to the brake structure per se, as this is in common use in other connections. Only a slight movement of the armature 117 is required to release braking action.

The record carrying drum 25 has directly mounted upon it a commutator segment 360 in the form of a complete annulus into which one relatively wide radial strip 118 and two relatively narrow radial strips 119 and 120 are inlaid. One of the line conductors 602 may be connected, as by a brush such as that shown in Figs. 2 and 3, with the segment 360. This brush is wide enough to span the inserted insulating strips and to maintain the ring 360 energized at all times.

Coacting with the ring 360 is a brush 125 urged by compression spring 126 toward the commutator and connected by conductor 127 through the energizing coil of the brake with the other line conductor 603. Whenever the brush 125 is in contact with the metallic conducting commutator ring 360, the brake coil is energized and the brake is thereby rendered inoperative to permit free rotation of the record carrying wheel or drum.

As in the constructions previously described, the brush 125 is mounted in the end of an arm 128 manually adjustable coaxially with the record carrying wheel and connected by chain 129 and sprocket 130 with a hand lever 131 movable with respect to a fixed index 132. As the pointer 49 traverses the index from end to end, the arm 128 will make approximately a full 360 degree rotation.

Assuming the record carrying wheel to be in rotation, the brake being free due to the energization of its coil through the commutator and brush assembly, one or the other of the insulating strips 119, 120 will sooner or later pass beneath the brush 125 to interrupt the current and thereby to permit the brake to act on the disk 31 to arrest the movement of the drum. However, the strips 119, 120, are only very slightly wider than the brush 125 and, consequently, if the drum has any appreciable speed, it will pass beyond the trip 119 or 120 on to a narrow conducting portion of the commutator ring 360 between strip 119 or 120 and strip 118, whereby the brake will again be released momentarily. However, in the continued remaining movement of the record carrying wheel, the brush 125 will now pass on to the wider insulating strip 118, this being sufficiently wide to assure that the resulting braking action will arrest the remaining movement of the wheel to bring it to a complete stop.

It will be apparent that any movement of the hand lever 131 from the position at which the wheel has come to rest will move the arm 128 and the brush 125 to a new position in which the circuit will be closed to release the brake. Under some circumstances, however, it may be desired to move the wheel, possibly just a short distance, without using the automatic indexing brake. For this purpose, a switch 133 having its manually operable button conveniently located is shunted across the commutator so that the operator may at any time, regardless of the position of the brush with respect to the dielectric inserts 118, 119, 120, close the circuit through the brake coil to release the brake, thus permitting free rotation of the carrier.

For some purposes it is advantageous to have a more accurate control of the brake with reference to the speed of carrier movement to assure that the record carrier will stop at exactly the desired point. Fig. 11 shows a construction similar to that shown in Fig. 8 except that two separate brake disks 31 and 310 are employed. One of these may, if desired, be smaller than the other to exert lighter braking pressure on the shaft 221 upon which the record carrier 25 is mounted.

The respective brake releasing coils 116 and 1160 are controlled through separate commutator rings 361 and 362. The outer of these has a single dielectric insert at 37 like that shown in Fig. 4 and receives current directly from line conductor 604. The inner ring 362 likewise receives current directly from line conductor 604 but it is provided with a dielectric insert 1200 in the form of a channel which completely insulates the conducting segment 18 from the rest of the commutator ring 362. In conductor 18, there is in turn inserted an insulating strip 1180.

The arm 1280 is manually set to a predetermined position in the same manner in which arm 128 is set in the construction shown in Fig. 8. It differs therefrom in carrying two brushes 125 and 1250 registering with the respective commutator rings and arranged to control the respective brakes. Brush 125 is connected through coil 116 of the larger brake to the line conductor 605 so that whenever brush 125 engages the commutator ring 361, the braking pressure on disk 31 is released.

Similarly brush 1250 is connected through the coil 1160 of the other brake to the line conductor 605 so that whenever brush 1250 contacts the commutator ring 362, the braking pressure on disk 310 is released.

The inserted conductor 18 is connected by wire 134 with a centrifugal switch 135 mounted on the shaft 221 and energized by the same current supplied to the inner commutator ring 362. Thus the inserted commutator sector 18 is supplied with current to hold the brake off only when shaft 221 is operating at a speed sufficiently low so that the spring tension on the governor weights of the conventional centrifugal switch 135 may close such switch. This centrifugal switch, like that used to control the starting windings of an electric motor, will be opened by the weights whenever shaft 221 rotates in excess of predetermined speed. When the switch is open, no current will pass to the commutator sector 18 and, under such circumstances, the engagement of the brush 1250 therewith cannot release the braking pressure on brake disk 310.

Assuming the arm 1280 to be adjusted to a new position by movement of the hand lever 131 with respect to the index 132, the brushes 125 and 1250 will be engaged with the live portions of the commutator rings to release both brakes and the record carrying wheel or drum will move freely. Regardless of how the motion of such drum is initiated, either by hand or power, it may then be set in operation. As it approaches a position to which the arm has been pre-set, the brush 1250 will leave the ring 362 and cross the insulating insert 1200 to the auxiliary commutator sector 18. If the rate of rotation of the record carrier is below the predetermined point determined by the centrifugal switch 135, the winding 1160 of the smaller brake will continue to get the current and the brake will not act. However, if the speed of rotation is in excess of that predetermined speed, the centrifugal switch 135 will function to deprive the auxiliary commutator sector 18 of the current, thereby allowing the smaller brake to reduce the speed. As soon as the speed is reduced to that predetermined value for which the centrifugal switch 135 is set, the smaller brake will receive current and will release its braking action so that the wheel will continue in rotation at that predetermined rate. Thus the wheel will tend to be rotating at a definitely predetermined rate when the insulated dead spot 37 of the external commutator ring 361 approaches a position of registry with brush 125. As brush 125 rides on to the insulation 37, the inner brush 1250 will simultaneously ride on to insulation 1180 with the result that both brakes will now be operated to stop the rotation of the wheel. However, such rotation will not only be slow at this time but will tend to be at an exactly predetermined value so that, with both brakes acting, the wheel will require an exactly predetermined amount of overrun before being brought to rest. Such overrun can be allowed for in positioning the pointer 49 with respect to the index or, if the rotation is always in the same direction, the predetermined overrun may be allowed for in determining the initial position of the index scale respecting the pointer.

The construction shown in Fig. 14 is one in which the shaft 222, on which the record carrying wheel 25 is mounted, may be actuated by a hand lever 140 through an overrunning clutch of the roller type at 141. The hand lever may be counterweighted at 142 or otherwise held normally in an upright position convenient to the operator's hand. A slight pull on the hand lever 140 will set the wheel in rotation and its movement may be arrested by any one of the brake mechanisms herein described. The manner in which the brush carrying arm 1281 is mounted differs slightly from the constructions previously disclosed, but the organization is equivalent.

By way of illustration, I have shown the shaft 222 equipped with the dual brake assembly and centrifugal switch of Fig. 11. The two brake drums 311 and 312 are unitarily formed and mounted on the shaft with their respective brake shoes controlled by armatures 116 and 1160 in opposition to compression springs exactly as shown in Fig. 11. The wiring from the centrifugal switch 135 may be connected through the hollow interior of shaft 222 to the appropriate sectors 362 and 18 of the inner commutator ring. Thus this device combines the advantages of uni-directional operation, multiple braking, and centrifugal switch regulation of braking, for maximum accuracy of electrical selection.

Figure 15:
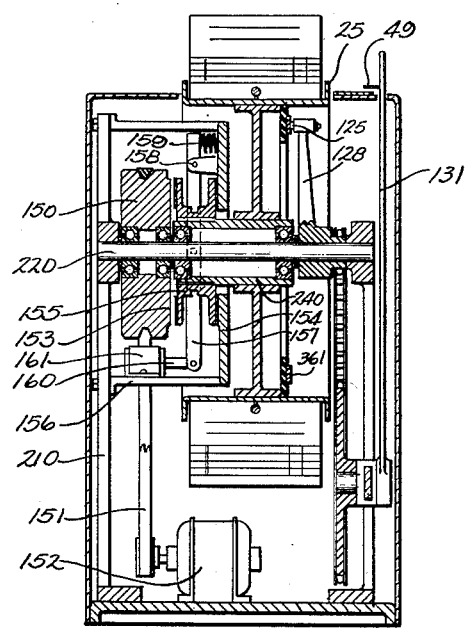
Fig. 15 is a view in transverse section through a still further modified embodiment of the invention.
Figure 16:
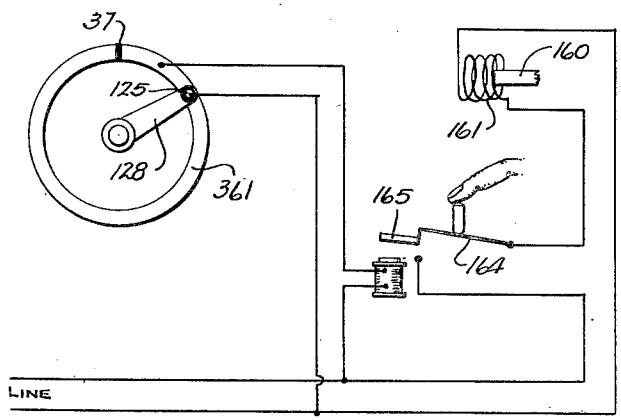
Fig. 16 is a wiring diagram of the device shown in Fig. 15.

As previously indicated, it is quite desirable for many reasons that the record carrier should always operate in the same direction so that the cards will always open at the same point in the rotation of the wheel and the overrun will always occur in the same direction when the brake acts, so that it may be allowed for. Figs. 15 and 16 show a convenient way for initiating rotation of the wheel to impart to it a predetermined speed which may be a substantial speed, without using much power.

The fact that the speed is of predetermined value in the first instance is obviously another factor contributing to accuracy in arriving at a particular card when the pointer of the manually set control lever 131 is moved to a particular position opposite the index.

In the construction shown in Figs. 15 and 16, the relatively fixed bar 220 upon which the record carrying wheel 25 is journaled for rotation also supports a freely rotatable fly wheel 150 driven by belt 151 from a relatively light and inexpensive motor 152. The motor will tend to keep the fly wheel in rotation at a constant rate. A clutch surface is provided on the inner face 153 of the fly wheel and another clutch surface is provided on the inner face of a stationary brake disk 154 carried by bracket arms 156 from the frame 210. The spool-shaped clutch member 155 is splined to the hub 240 of the record carrier 25 to be moved axially into alternative engagement either with the stationary brake disk 154 or the rotating fly wheel 150. The clutch shifting lever 157 is pivoted at 158 and biased by compression spring 159 toward a position to engage the moving clutch element 155 into operative contact with the stationary brake disk 154. Connected to such lever is the armature 160 of an electromagnet 161. When the brush 125 on arm 123 is engaged with the commutator ring 361 on the record carrier, the resulting energization of coil 161 releases the brake and connects the fly wheel with the record carrier whereby motion is imparted thereto due to the inertia of the fly wheel. As soon as the brush 125 encounters the insulating segment 37, or dead spot, the record carrier is disengaged from the fly wheel and connected with the brake whereby its motion is arrested. If desired, the initiation of motion need not be dependent upon the mere readjustment of the index lever 131, but may be controlled by a manually operable switch 164 provided with an armature 165 so that as soon as motion is initiated, the switch will be held closed until the circuit through the commutator assembly is broken, at which time the switch will be opened by its inherent bias.

During the time that the operator is examining the records brought to the inspection station by the mechanically controlled structure above described, the small motor 152 will be bringing the fly wheel back to its predetermined speed. Thus, the motor is not relied upon to overcome the inertia of the record carrier but gradually builds up fly wheel momentum to perform this function.

The device shown in Figs. 17 to 19 does not include any disclosure of any specific means, other than the cards themselves, for initiating rotation of the filing wheel, it being understood that any of the wheel rotating devices hereinbefore disclosed may be employed, if desired. The purpose of the disclosure of Figs. 17 to 19 is to illustrate how the selection mechanism may be operated entirely mechanically, instead of electrically, to cause a brake to function.

The wheel which carries the records is shown at 253 to be mounted on a shaft 223. Concentric with such shaft is a stationary brake drum 313. Mounted on the wheel itself by means of a pin 167 are brake shoes 168 and 169 which may be expanded into engagement with the drum by the rotation of cam 170 (Fig. 19), the cam being mounted on a rock shaft 171 which extends through the wheel.

At the other side of the wheel, the rock shaft carries an arm 172 at the end of which there is a cam follower roller 173 riding on the periphery of cam 174 having a retractible nose portion 175. The retractible cam nose 175 is urged radially outwardly by spring 176 and is also normally held in its extended position by toggle linkage 177, connected at its mid-point pivotally to a spool 178 slidable on shaft 179. At one end, the toggle linkage is fastened at 180 to the cam disk 174. At its other end, the toggle linkage is pivoted at 181 to the slidable cam nose 175. Thus, when the spool 178 is moved to the right as viewed in Fig. 17, the toggle linkage "breaks" and the cam nose slide 175 is retracted toward the center of disk 174.

The index control lever 46 is connected by a chain in the manner previously described with shaft 179 for the rotation of the cam disk to a point determined by the position of the lever 131, such position being indicated, as usual, by the pointer 49.

Whenever, in the rotation of the record wheel 253, the roller 173 carried by such wheel rides on to the cam nose 175, the resulting oscillation of rock shaft 171 will expand the brake shoes into the stationary brake drum 313, thereby bringing the wheel to rest. According to the design of the cam, the stoppage of the wheel may be made as gradual or as abrupt as may be desired.

When it is desired to release the wheel for further rotation, the operator presses the foot treadle 181, which is connected by link 182 and bell crank 183 with the spool 178, thereby drawing the spool to the right to "break" the toggle linkage and to retract the cam nose slide 175, thereby enabling the roller 173 to clear the cam and to release the brake.

In the device shown in Figs. 20 to 23, there is no friction brake but the indexing is accomplished mechanically without shock to the mechanism.

In this construction, the wheel 254 is mounted to rotate a shaft 224. At a predetermined point, the wheel carries an axially projecting lug 186. Rotatably mounted on the stationary bar 187, is the hub 188 of an arm 189 upon which there is radially slidable a latch member 190 having at 191 a notch in which the lug 186 is receivable. The sides of latch member 190 are beveled to permit it to ride over the lug 186 to the point of engagement of the lug in such notch and a compression spring 193 urges the latch member 190 toward a position of engagement with the lug.

Mounted for oscillation on the hub 188 of arm 189 is a disk 195 having a toothed periphery. A pin 196 projecting laterally from the disk has pivoted connection with the rods 197 of one or more pistons 198 operating in cylinders 199 against the compression of centering springs 200. The cylinders are respectively pivoted to ears 202, one of which is shown in Figs. 20 to 21 projecting from the frame. The arrangement comprises a dashpot organization which keeps the oscillatable disk 195 normally centered in a predetermined position respecting the frame, from which, however, the disk is yieldable to a limited extent in either direction.

The hub 188 of the arm 189 is indexed by lever 454 through a sprocket and chain connection such as has already been described. A pointer 49 near the end of such lever operates over the usual alphabetical or numerical fixed index scale 48. By manipulating the index lever, the arm 189 may be rotated to any desired angular position.

In any given position of adjustment of the index lever 189, such lever is locked to the periphery of the toothed disk 199 by means of a dog 205 mounted on the arm 189 by means of a slide 206 normally retracted toward the axis of the device by a spring 207 encircling the push rod 208 constituting an extension of the slide 206.

At its inner end, the rod 208 rides on a conical cam 209 carried by a push rod 210 mounted for axial sliding movement through the stationary bar 187 and normally retracted toward the position shown in Fig. 20 by a compression spring 211. Bearing on the end of the push rod 210 is a bell crank 214 operated by a Bowden wire 215 from a button 216 in the end of the handle portion of lever 454. Thus, by simply depressing the button 216, the operator can disengage dog 205 from the toothed disk 195 and simultaneously lift latch 190 from engagement with lug 186, the latch member being connected with slide 206 by means of the pin shown in full lines in Fig. 22 and in dotted lines in Fig. 20 upon such disengagement, the operator can manipulate the arm 189 to any selected position at which it is desired to bring the wheel to rest. Thereupon, releasing the push button 216 will again lock arm 189 to the cushioned disk 195 and, as the wheel rotates toward the selected position, the beveled surfaces of the latch member 190 will rise over the lug 186 and such lug will ultimately engage in the notch 191 of the latch member, thus completing the latching of the wheel through the adjustable arm to the cushioning disk 195. The motion of the wheel is now absorbed through disk 195 in the dashpot arrangement which limits disk oscillation. Thus the wheel is brought to rest and returned by the dashpot springs to the exact position at which the wheel lug 186 became engaged in the latch member 190.

It will be understood that the foregoing mechanism are merely illustrative of many possible arrangements in which the wheel may be brought to rest at any one of a number of selected positions. In all, seven distinct devices have been disclosed, with and without brakes and some functioning electrically and some mechanically, some with power operation and some with manual operation, some operating in both directions and some in but one direction (so far as selection is concerned).

By way of summary and comparison, I may list these briefly:

The construction shown in Figs. 1 to 4 may be operated by power with push button control in either direction to any extent to which the push button is maintained depressed, but where the automatic indexing mechanism is employed to arrest the power operation at a predetermined point, such operation always occurs in the same direction so that the slack between cards on the wheel is always accumulated in the same manner and the same direction.

The device shown in Figs. 5, 6 and 7 is power operated with automatic indexing in either direction and further suggests how, in any of these devices, a "micro switch" or its equivalent may be substituted for a conventional commutator. This construction further suggests relay means for taking over the control of the direction of operation and maintaining such direction irrespective of further manipulation of the lever, until the wheel comes to rest at the selected position.

The device shown in Figs. 8 to 10 shows a wheel operated manually by means of its rim, but arrested as to motion at any predetermined point selected with reference to the fixed index. This device further illustrates one way of accomplishing a preliminary braking operation to retard the motion of the wheel before it is finally brought to rest.

The device shown in Figs. 11 to 13 suggests a manner in which any one of the devices disclosed may have a retarding braking action controlled centrifugally so that when the wheel becomes subject to the stopping brake, it will always have approximately the same speed of operation.

Fig. 14 suggests how the preferred unidirectional rotation of the wheel may be achieved with a hand lever and an overrunning clutch. It will be understood that a foot pedal may be substituted for the hand lever to leave the operator's hand unencumbered and that by simply providing two such levers or pedals, with their clutches acting in opposite directions, it is possible to provide for reverse operation of the wheel, if desired.

Figs. 15 and 16 suggest a means of unidirectional operation of the wheel with low power by cumulating energy in a fly wheel and alternatively clutching the wheel either to the fly wheel or to a braking surface.

Figs. 17 and 18 show a device in which automatic selection is achieved without power, through purely mechanical means, equivalent in a broad sense, to the electrically operable selection means disclosed in other devices.

The device of Fig. 20 and Fig. 21 adds the suggestion that instead of using friction brakes, as suggested in many of the other devices, it is possible to employ a positively acting brake to arrest the motion of the wheel exactly at a selected point without overrun or underrun, regardless of the rate at which the wheel is in operation.

It is my intention that these various features be used interchangeably, wherever appropriate, in the various devices, and that the specific constructions disclosed be regarded as merely exemplifications of the possibilities.

It will, of course, be understood by those skilled in the art that the index may be either alphabetical or numerical. As shown, it is arranged to read from back to front in order that the movement of the record carrier, if the reversing construction of Figs. 5 to 7 is used, will correspond in direction with the direction of movement of the control lever. However, it is intended that the indexed arrangement of the individual cards on the carrier read from front to back at the exposed top section, in accordance with usual filing practice. If it be desired that the stationary index scale be likewise arranged to read from front to back, it is only necessary to provide for a reversal of the driving connections between the lever and the brush carrying arm so that the arm will rotate in a direction opposite to that in which the lever oscillates.

Where maximum accuracy of automatic selection is desired, it is, for reasons above stated, preferred that the carrier always move counter-clockwise, as viewed in the drawings, so that the cards exposed at the inspection station will always be moving toward the operator. While the manually operable devices of Figs. 8 to 13 may be operated in either direction, the construction shown in Figs. 5 to 7 is the only one necessarily operated in both directions. The devices shown in Figs. 1 to 4 and 14 to 16 are necessarily operated in one direction only and these arrangements are, therefore, to be preferred.

Accuracy of selection may, however, be improved by using either the double acting brake arrangement of Figs. 8 to 10 or, preferably, the dual brake arrangement with centrifugal switch control as shown in Figs. 11 to 13, or the positively acting latch type brake of Figs. 20 to 23, these brake organizations being intended to be used with all of the devices shown, regardless of how motion of the record carrying wheel is initiated.

Whenever the wheel is operated by power, it is of practical value to be able to "inch" it in an indexing direction. This may be done, for example, either by pushing one of the buttons F or R in the construction shown in Figs. 1 to 4 or, if the desired "inching" is in a forward direction, it may be done by almost imperceptibly advancing the control lever 45, 46, in a forward direction. It is not necessarily required that the wheel make a complete circuit when successively desired cards happen to be close to each other alphabetically. The brake gives accurate control to limit the wheel movement to that amount actually necessary to bring the desired card within reach of the operator at the inspection station.

We claim:

1. The combination with a rotatably mounted record-filing wheel, of a control comprising actuator and contact elements, one of said elements being connected with the wheel and the other being manually adjustable, means for reversibly actuating the wheel, an index scale, a member adjustable respecting the scale and connected with the manually adjustable element, and a handle mounted on said member and provided with means connecting it to said member by which it is adapted for limited movement respecting said member, switch means mounted between the member and the handle and adapted to be closed alternatively by the limited movement of the handle respecting the member, according to the direction in which the handle is operated to move the member, and electrical connections from the switch means for controlling the direction in which the wheel is operated.

2. The device of claim 1 in which the electrical connections which control direction of operation include relay means through which a circuit is established by the closing of one of said switches to determine the direction of wheel operation, said relay means comprising means for interrupting the circuit to the other of said switches pending operation of the wheel subject to the control of the first switch closed by manipulation of the handle.

3. The combination with a record carrying wheel having peripheral means for mounting cards on edge, of a bearing support upon which said wheel is rotatable, a cabinet enclosing said support and a portion of said wheel and having an opening through which an upper peripheral portion of the wheel projects, an index scale on the upper part of said cabinet adjacent said opening, a selector movable along said scale through a predetermined range, a brake for the wheel, brake control connections including relatively movable members, one of said members being connected with the wheel to make a full 360° rotation in the course of equivalent rotation of the wheel and the other of said members likewise having a full 360° range of rotation coaxially with the member connected with the wheel, and motion transmitting connections from said other member to said selector for moving said other member through a 360° of range of adjustment in the movement of said selector through its predetermined range aforesaid, the member connected with the wheel being freely rotatable therewith without range limitation and subject only to the action of said brake on said wheel, and a reversible motor having driving connections to said wheel and with which said brake is operatively connected for the control of the wheel through said driving connections, said selector having an independently movable handle portion and a pair of switches selectively closed by relative movement of the handle portion respecting the selector, circuit connections whereby the respective switches control the respective directions of motor operation, said circuit connections including holding relay means for maintaining the motor in operation after the relatively movable handle portion is released by the operator.

4. The combination with a freely rotatable record-carrying wheel provided on its periphery with means for mounting records on edge, of a bearing support on which the wheel is rotatable, cam means connected for rotation with the wheel, a switch having a normally closed contact having an operating part exposed for operation in a circuit opening direction by the cam means, a carrier for the switch rotatable co-axially with the wheel, means providing an index scale, a selector movable along the scale and connected with the carrier for movement of said carrier and switch to a position corresponding to each given position of the selector respecting said scale, a handle portion pivoted to the selector for oscillation with respect thereto, a pair of control switches having contacts in the path of oscillation of the handle portion to be closed by said handle portion respectively according to the direction of handle portion oscillation respecting the selector, the said handle portion being normally centered between said contacts and the control switches being normally open, a reversible motor operatively connected with said wheel for effecting driving rotation thereof, and motor energizing circuits including the respective control switches and further including said first mentioned switch, whereby the oscillation of the handle portion respecting the selector will energize the motor for driving the wheel in a direction corresponding to that to which the handle portion is oscillated upon the selector.

5. The device of claim 4 in further combination with a brake for said wheel comprising an electro-magnet controlling the brake and connected with said circuits to be energized thereby.

6. The device of claim 5 in which the respective circuits comprise holding relays whereby to continue the energization of said motor after release of said handle portion until the respective circuit is opened by engagement of said cam with said first mentioned switch contact.

7. In a device of the character described, the combination with a rotatably mounted record filing wheel provided with bearings for its support, of means for reversibly driving such wheel and comprising a motor, power-transmitting connections from the motor to the wheel and reversible circuit connections for controlling the directions of wheel operation from said motor, the circuit controller common to said reversible circuit connections and including one part connected for rotation with the wheel and another part manually adjustable and mounted for arcuate movement co-axially with said first part, said circuit controller comprising normally closed contacts open to de-energize the motor when said parts register in the course of wheel rotation in a position to which the manually adjustable part is set, a selector lever connected with the second part for the manual adjustment thereof, means providing an index scale with respect to which said lever and second part is movable, a handle pivotally connected with the lever for oscillation with respect thereto, and a pair of switches selectively actuated by said handle according to its direction of oscillation and in series with the respective reversible motor-energizing circuits for determining the direction of wheel rotation according to the direction in which said handle is tilted on said lever.

JEROME L. CLOUGH.
CHAUNCEY C. CLOUGH.

References Cited in the file of this patent

UNITED STATES PATENTS

| Number | Name | Date |
|---|---|---|
| 979,720 | Sundh | Dec. 27, 1910 |
| 1,072,007 | Hick | Sept. 2, 1913 |
| 1,228,963 | Perepelkin | June 5, 1917 |
| 1,508,796 | Kaminski | Sept. 16, 1924 |
| 1,683,491 | Rippon | Sept. 4, 1928 |
| 1,709,430 | Hentzschel | Apr. 16, 1929 |
| 1,871,164 | Dunlop | Aug. 9, 1932 |
| 1,925,881 | Rhea | Sept. 5, 1933 |
| 1,960,814 | Iversen | May 29, 1934 |
| 2,025,633 | Benson | Dec. 24, 1935 |
| 2,046,655 | Scholfield | July 7, 1936 |
| 2,079,442 | Fuller et al. | May 4, 1937 |
| 2,107,894 | Hymans | Feb. 8, 1938 |
| 2,116,739 | Eason | May 10, 1938 |
| 2,168,323 | Bruen | Aug. 8, 1939 |
| 2,170,510 | Trible et al. | Aug. 22, 1939 |
| 2,213,825 | Seeley | Sept. 3, 1940 |
| 2,235,736 | Bruen | Mar. 18, 1941 |
| 2,314,705 | Johnson | Mar. 23, 1943 |
| 2,328,055 | Clough | Aug. 31, 1943 |
| 2,335,937 | Harrison | Dec. 7, 1943 |
| 2,340,612 | Peets et al. | Feb. 1, 1944 |